US00RE37371B1

(19) United States
(12) Reissued Patent
Gerow

(10) Patent Number: US RE37,371 E
(45) Date of Reissued Patent: Sep. 18, 2001

(54) METHOD, APPARATUS AND GAMING SET FOR USE IN A PROGRESSIVE GAME

(76) Inventor: Jay E. Gerow, 20526 W. Richmond Rd., Bothell, WA (US) 99802

(21) Appl. No.: 09/325,121

(22) Filed: Jun. 3, 1999

Related U.S. Patent Documents

Reissue of:
(64) Patent No.: 5,647,592
Issued: Jul. 15, 1997
Appl. No.: 08/692,014
Filed: Aug. 2, 1996

(51) Int. Cl.[7] ..... A63F 3/00
(52) U.S. Cl. ..... 273/139; 463/26
(58) Field of Search ..... 273/139, 138.1, 273/138.2; 463/17, 18, 19, 26–28, 42

(56) References Cited

U.S. PATENT DOCUMENTS

| | | | | |
|---|---|---|---|---|
| 3,900,219 | * | 8/1975 | D'Amato et al. | 273/139 |
| 4,740,016 | | 4/1988 | Konecny et al. | 283/903 |
| 4,832,341 | * | 5/1989 | Muller | 273/139 |

(List continued on next page.)

FOREIGN PATENT DOCUMENTS 2 232 358 * 12/1990 (GB) .
59-178573 * 12/1990 (JP) .

OTHER PUBLICATIONS

"Tab Force" brochure, Infinity Group, Inc., Albuquerque, New Mexico, Date Unknnown.*

Betty Boop Round Top Designs, Bally Gaming Systems, Date Unknown.*

Third Amendment to the Tribal/State Compact for Class III Gaming Between the Nooksack Indian tribe and the State of Washington (2 pages), Appendix X (46 pages) and Trbial—State Compact for Class III Gaming Between The Nooksack Indian Tribe and the State of Washington (pages 4–7), dated Oct. 28, 1991.*

Bally Gaming Slots, 1996–1998, 23 pages.*

(List continued on next page.)

*Primary Examiner*—Benjamin H. Layno
(74) *Attorney, Agent, or Firm*—Kolisch, Hartwell, Dickinson, McCormack & Heuser

(57) ABSTRACT

A pull-tab gaming set, a progressive pull-tab gaming system and a method of operating a progressive pull-tab game. The gaming set includes a plurality of pull-tab cards, each card having a front portion, a back portion and a selectively revealable gaming section. The gaming section contains indicia of a redemption value of the card which is unascertainable until the gaming section is revealed. There are at least [three] *two* classes of pull-tab cards in the gaming set in the form of winners having indicia of a fixed non-zero value, [losers having indicia of a zero value] and at least one jackpot card with indicia of an undetermined total value. The progressive pull-tab card game system includes a pull-tab dispensing unit, configured to dispense pull-tab cards, a jackpot display, and a control system operatively connected to the dispensing trait to monitor the quantity of pull-tab cards dispensed. The control system is configured to compute a jackpot value dependent on that quantity and operatively connected to the jackpot display to cause it to display the computed jackpot value as pull-tabs are dispensed. The method of operating a progressive pull-tab game includes the steps of providing a set of pull-tab cards which includes at least one jackpot card without a predetermined total value, setting a progressive jackpot to a predetermined value, displaying the progressive jackpot, dispensing one of the pull-tab cards to a player, selectively increasing the value of the progressive jackpot, repeating the steps of displaying, dispensing and selectively increasing until the jackpot card is dispensed and then awarding the progressive jackpot to the player that received the jackpot card.

51 Claims, 4 Drawing Sheets

U.S. PATENT DOCUMENTS

| | | | | |
|---|---|---|---|---|
| 4,943,090 | * | 7/1990 | Fienberg | 273/139 |
| 4,982,337 | * | 1/1991 | Burr et al. | 364/479 |
| 5,007,641 | | 4/1991 | Seidman | 273/139 |
| 5,046,737 | * | 9/1991 | Fienberg | 273/139 |
| 5,129,652 | | 7/1992 | Wilkinson | 273/139 |
| 5,290,033 | * | 3/1994 | Bittner et al. | 273/138.2 |
| 5,324,035 | * | 6/1994 | Morris et al. | 273/139 |
| 5,344,144 | * | 9/1994 | Canon | 273/143 R |
| 5,348,299 | * | 9/1994 | Clapper, Jr. | 273/138.2 |
| 5,377,975 | * | 1/1995 | Clapper, Jr. | 273/138.2 |
| 5,407,109 | * | 4/1995 | Gumina | 273/139 |
| 5,407,200 | * | 4/1995 | Zalabak | 273/139 |
| 5,487,544 | * | 1/1996 | Clapper, Jr. | 463/16 |
| 5,536,008 | | 7/1996 | Clapper, Jr. | 463/16 |
| 5,536,016 | | 7/1996 | Thompson | 273/269 |
| 5,580,311 | * | 12/1996 | Haste, III | 463/29 |
| 5,595,538 | * | 1/1997 | Haste, III | 463/17 |
| 5,657,991 | | 8/1997 | Camarato | 273/269 |

OTHER PUBLICATIONS

The Future of the Scratch Ticket is Here brochure, Oasis Technologies, Inc., 1997.*
Oasis ITVM Fact Sheet, 2 pages, 1997.*
Oasis Lottery Game Center System, 1 page, 1997.*
Oasis Technologies, Inc. Company Profile, 9 pages, 1997.*
Bally Gaming, The World's Game Maker brochure, 1998.
Game Maker Slant–7200 product specification sheet, 1998.
ProSlant 6000 Product specification sheet, 1999.

* cited by examiner

METHOD, APPARATUS AND GAMING SET FOR USE IN A PROGRESSIVE GAME

Matter enclosed in heavy brackets [ ] appears in the original patent but forms no part of this reissue specification; matter printed in italics indicates the additions made by reissue.

This invention relates generally to gaming. More particularly, the invention relates to a method, apparatus and gaming set for use in a progressive pull-tab game.

BACKGROUND

"Pull-tab" is game of chance, commonly played in casinos and taverns. In a pull-tab game, participants purchase pull-tab cards from a large fixed pool or set. The game ends when the entire pool of cards has been purchased. The cards in a set are marked at the time of manufacture with various patterns of symbols or indicia. The indicia on the otherwise identical cards is covered when they are sold so that neither the operator nor player can see the indicia before the card is purchased. A certain number of cards in each set are manufactured with a pattern of indicia indicating that they are winners. Such winning cards will have a predetermined pay-off value: $1, $5, $1,000, etc. The remaining cards all have zero value.

The winning and losing cards are randomly mixed and externally identical. Therefore, the value of a card is not ascertainable prior to its opening upon purchase. Whether winner or loser, the value of each card is dependent only on the pattern of indicia printed thereon and therefore is predetermined at the time the cards are printed. Because the number of winning cards in a set, and the value of each, is known, the operator of the game knows the total pay-out for a game in advance, as do the players.

Most games of chance can be described as either progressive or nonprogressive. In non-progressive games, such as traditional pull-tab, participants play for a chance to win a predetermined prize, i.e., one of the winning cards. Progressive games, in contrast, involve a jackpot or prize that grows during the play of the game. Many state lotteries, for instance, fall into the progressive category because the prize increases over time as more players participate. During the operation of a progressive game, a portion of each player's purchase is dedicated to the prize. Thus, the prize grows until the winning numbers are selected and the game ends. Some slot machines also offer a progressive jackpot.

While progressive games typically offer participants greater excitement and appeal because of the opportunity to win a larger prize, such games are more complex to operate. Moreover, not all games of chance lend themselves to a progressive implementation. [Pull-tab, for instance, has not been amenable for implementation in a progressive game because of the use of a pre-printed set of cards with predetermined winning amounts.

It is therefore an object of the present invention to provide a progressive pull-tab game.

It is another object of the present invention to provide a gaming set of pull-tab cards suitable for use in a progressive pull-tab game.

One more object is to provide a method of conducting a progressive pull-tab game.

Yet another object of the present invention is to provide a system suitable for conducting a progressive pull-tab game.]

SUMMARY OF THE INVENTION

The present invention includes a pull-tab gaming set, a progressive pull-tab gaming system and a method of operating a progressive pull-tab game. The gaming set includes a plurality of pull-tab cards, each card having a [from] *front* portion, a back portion and a selectively revealable gaming section. The gaming section contains indicia of a redemption value of the card which is unascertainable until the gaming section is revealed. There are at least [three] *two* classes of pull-tab cards in the gaming set in the form of winners having indicia of a fixed non-zero value, [losers having indicia of a zero value] and at least one jackpot card with indicia of an undetermined total value.

The invention also encompasses a progressive pull-tab card game system including a pull-tab dispensing unit configured to dispense pull-tab cards, a jackpot display, and a control system operatively connected to the dispensing unit to monitor the quantity of pull-tab cards dispensed. The control system is configured to compute a jackpot value dependant on that quantity and operatively connected to the jackpot display to cause it to display the computed jackpot value as pull-tabs are dispensed.

One more aspect of the present invention is a method of operating a progressive pull-tab game including the steps of providing a set of pull-tab cards which includes at least one jackpot card without a predetermined total value, setting a progressive jackpot to a predetermined value, displaying the progressive jackpot, dispensing one of the pull-tab cards to a player, selectively increasing the value of the progressive jackpot, repeating the steps of displaying, dispensing and selectively increasing until the jackpot card is dispensed and then awarding the progressive jackpot to the player that received the jackpot card.

Many other features, advantages and additional objects of the present invention will be apparent to those versed in the art upon making reference to the detailed description which follows and the accompanying sheets of drawings in which a preferred embodiment incorporating the principles of this invention is disclosed as an illustrative example only.

BRIEF DESCRIPTION OF THE DRAWINGS

FIG. 1b shows a front side of the pull-tab card of FIG. 1a.

DETAILED DESCRIPTION OF THE PREFERRED EMBODIMENT

Figure 1A:
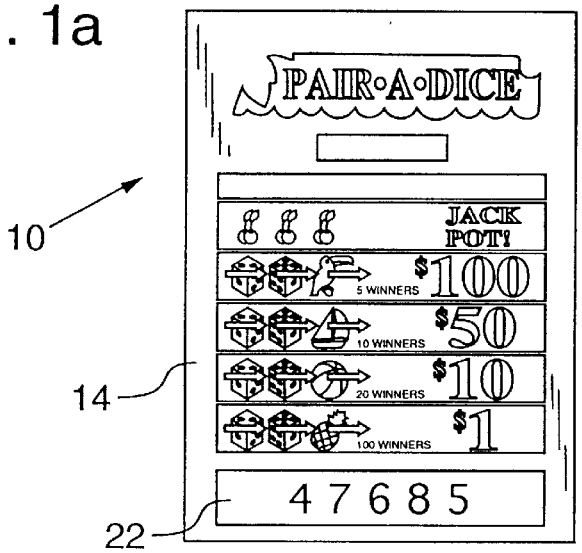
FIG. 1a shows a backside of a pull-tab card constructed according to the present invention.
Figure 1B:
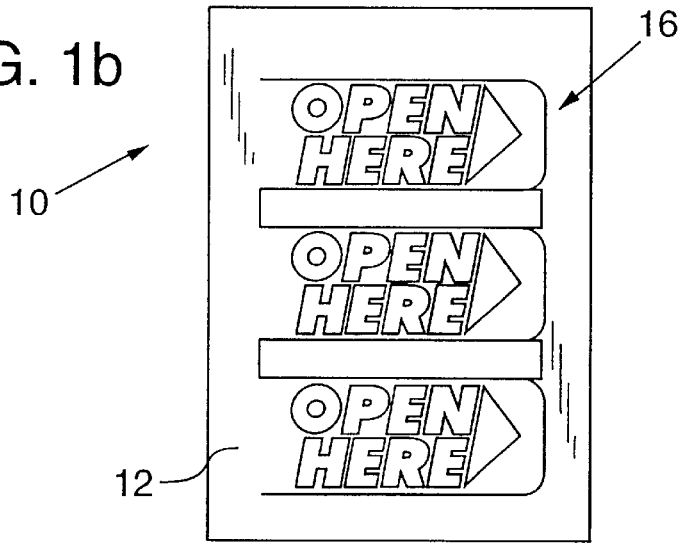
Figure 1C:
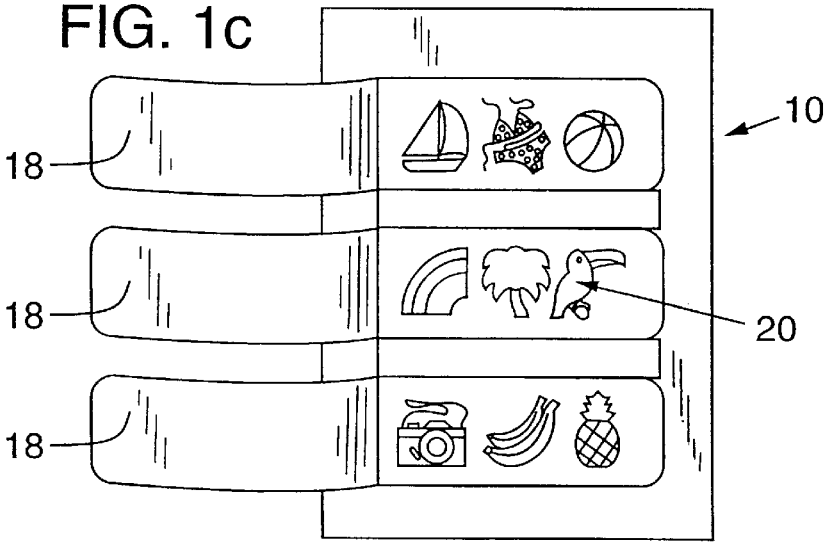
FIG. 1c shows the front side of the pull-tab card of FIG. 1a, showing lifted serrated flaps.
Figure 2:
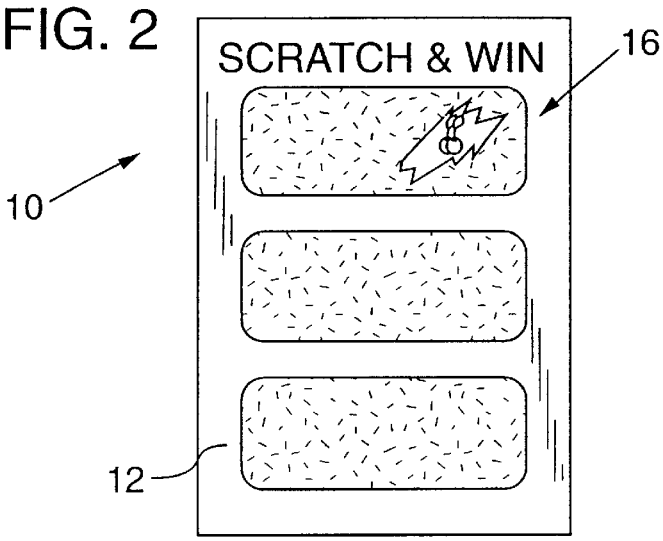
FIG. 2 shows an pull-tab card with a scratch-off coating suitable for [me] *use* in the present invention.

A pull-tab card for use with the present invention is shown generally at 10 in FIGS. 1a–c. Card 10 includes a front side 12 and a back side 14, with a selectively revealable gaming section 16 disposed on the front side. The gaming section, in the preferred embodiment, includes three serrated flaps 18 that can be lifted to reveal underlying indicia 20 of the value of the card. Although serrated regions are preferred, any other suitable selectively revealable region could be used, including among others, scratch-off coatings, such as shown in FIG. 2, or a separable two-part card, such as shown in U.S. Pat. No. 5,348,299, which is incorporated herein by reference.

Figure 3:
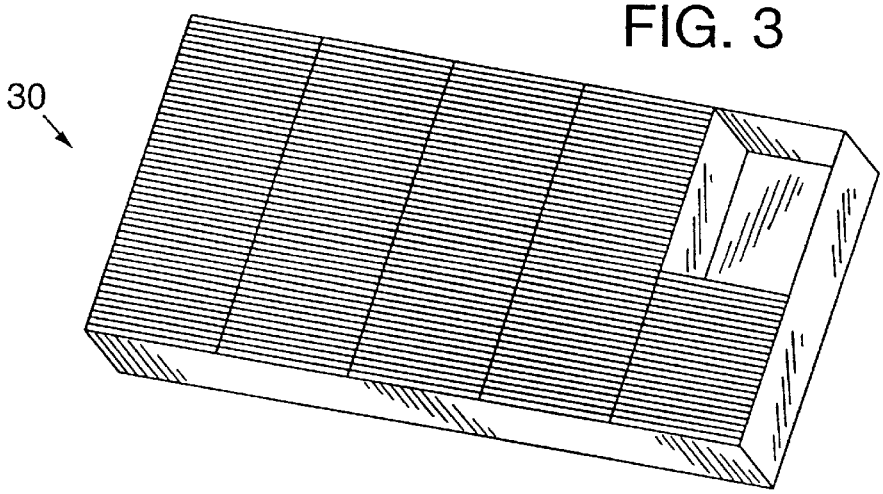
FIG. 3 is a perspective view of a pull-tab gaming set according to the present invention.

In the context of the preferred embodiment of the present invention, pull-tab cards, such as card 10, typically form part of a pull-tab gaming set as shown generally at 30 in FIG. 3. Card 10 also typically includes a printed gaming code 22, which is different for each set and therefore can be used to distinguish cards from different sets. Set 30 preferably includes three classes of cards. The first class, which usually constitutes the majority of the cards, is losers. Losing cards, such as card 10 in FIG. 1c, are those that have no redemption value.

Figure 4A:
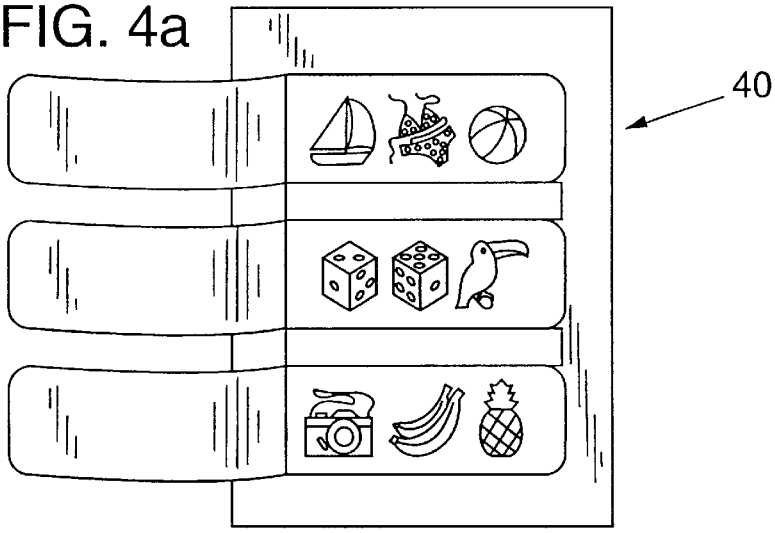
FIGS. 4a–b shown a winning card and a jackpot card according to the present invention.

The second class of cards in set 30 is winners, which have fixed non-zero values. Winner cards include an indicia of the amount of their redemption value. For example, a card in the winner class may have a value of $100, such as winner card 40 shown in FIG. 4a. Thus, a player receiving that card could redeem it with the operator of the game for $100. In the preferred embodiment, there are a number of different sub-classes within the winner class, and each sub-class has a different fixed value. In a typical set consisting of 4,000 cards selling for $1 each, there might be 100 cards in the $1 sub-class, 20 cards in the $10 sub-class, 10 cards in the $50 sub-class, 5 cards in the $100 sub-class and so on. Most commonly, there are fewer cards in the higher value sub-classes and more cards in the lower value sub-classes, although this is not essential.

Figure 4B:
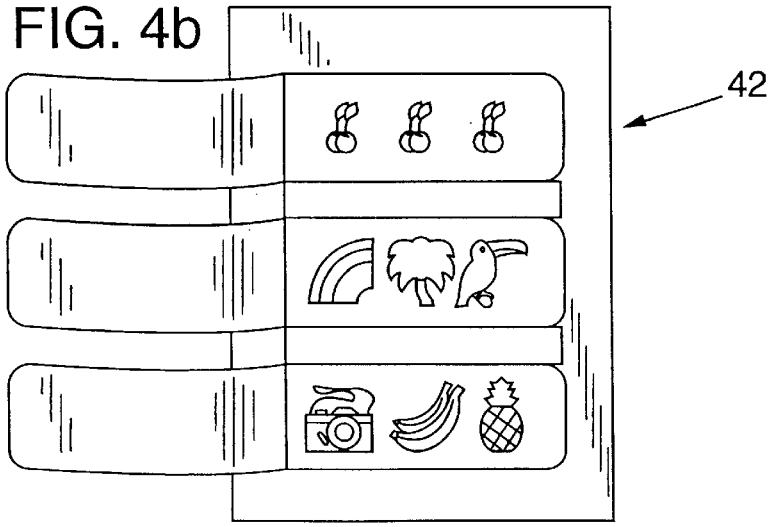

The third class in set 30 is the jackpot. In the preferred embodiment, there is only one jackpot card, shown at 42 in FIG. 4b[.], although there could be two or more jackpot cards as desired. The jackpot card has an undetermined redemption value. Thus, until it is received by a player, it is not possible to determine what its value will be. The value of the jackpot card is determined only during the play of the game, as will be described below. In the preferred embodiment of the present invention, as will be described in more detail below, the value of the jackpot card will go up during the play of the game. It is this increasing jackpot card value that provides the progressive aspect of the present invention.

As mentioned above, each card in the set is printed with indicia of its value. As shown in FIG. 1a, the back side of each card is preferably printed with a chart listing the indicia for each sub-class of winning cards as well as the jackpot class. The chart also lists the number of cards in each class and sub-class, and the value associated with each sub-class of the winning class. Any card bearing an indicia other than those listed on the chart is a loser. Thus, a player receiving a card will tear open the serrated section to reveal the gaming section and indicia printed therein. By comparing the indicia in the gaming section with those listed on the chart, the player can determine the class/sub-class of the card. For all cards other than the jackpot card, the player will also know the value of the card. The jackpot card has indicia from which the player can identify it as a jackpot card, but has an undetermined redemption value.

Figure 5:
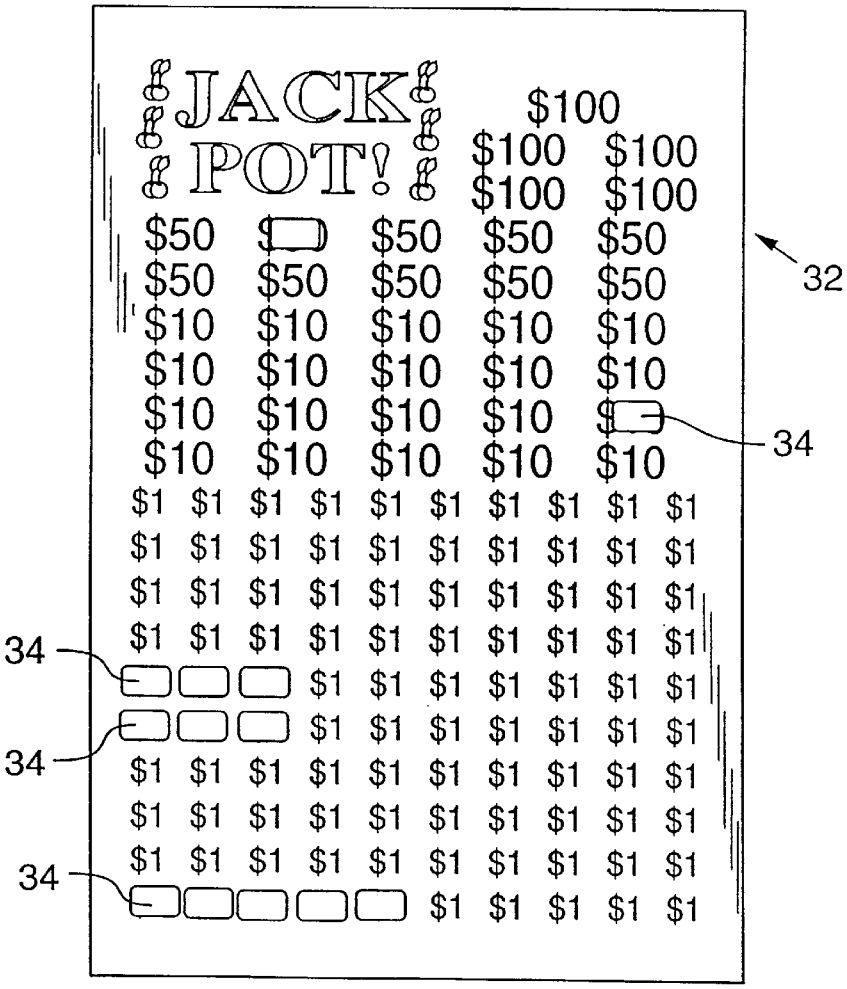
FIG. 5 is a sign for use with the present invention.

A sign 32, such as shown in FIG. 5, is normally provided in the general area where the cards are being dispensed to allow players to monitor what winning cards remain to be distributed. The sign includes a listing of each of the winning cards, and, as each winning card is redeemed, the operator of the game covers one of the listings for that sub-class of card, as shown at 34. Although this procedure is not required, it allows a player to glance at the sign and determine the number and type of winning cards remaining.

Figure 6:
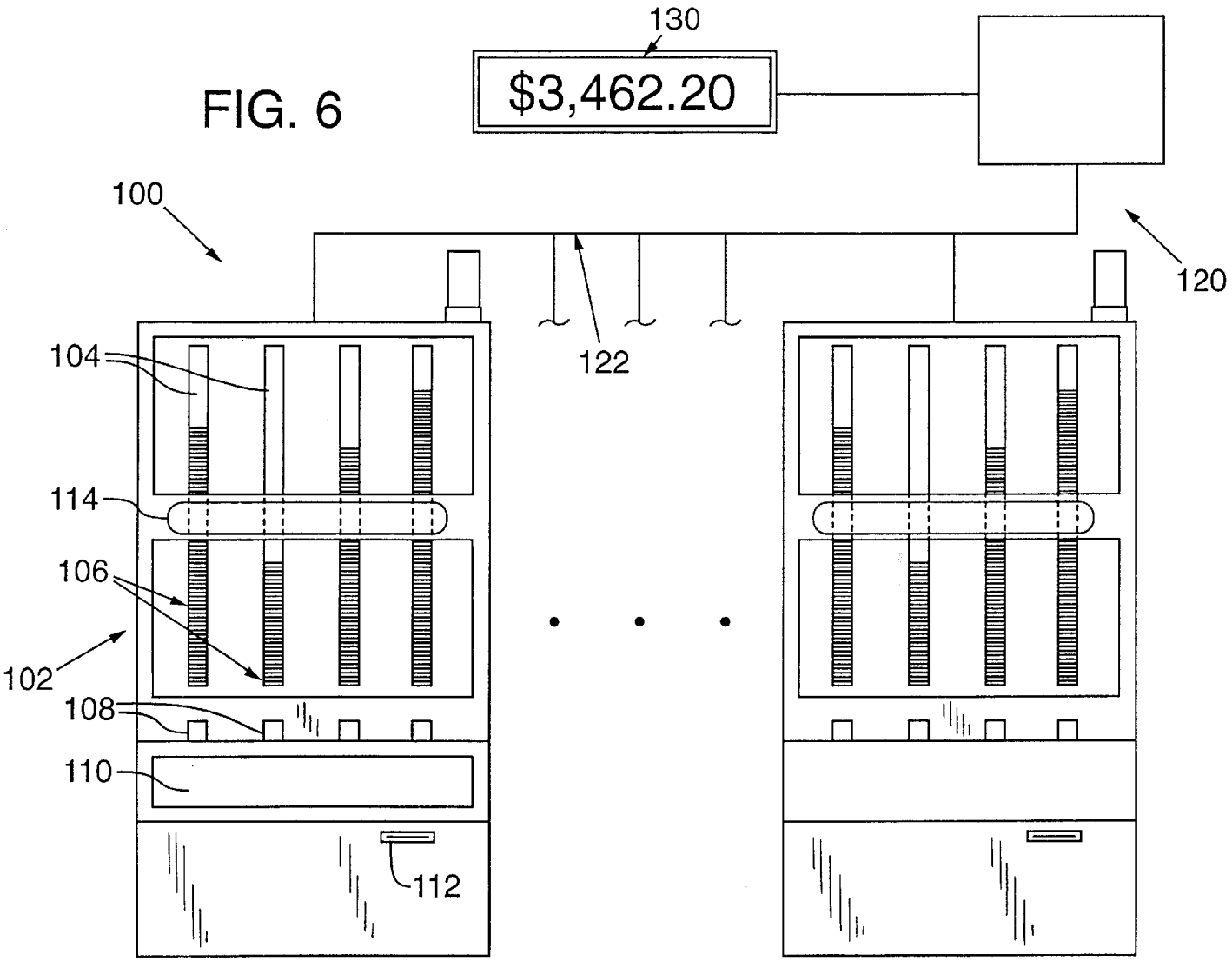
FIG. 6 is a progressive pull-tab gaming system constructed according to the present invention.

A system for conducting a progressive pull-tab game according to the present invention is shown generally at 100 in FIG. 6. System 100 typically includes one or more dispensing units, such as unit 102, configured to dispense pull-tab cards. In the preferred embodiment, unit 102 is a Lucky Pick Model No. LP1, sold by Over and Under Int'l Inc., of Clarkston, Wash., with a serial communications chip added to enable communication with a computer as will be subsequently described, although any other pull-tab dispensing unit could be made suitable for use in the present invention with minor modification. Each unit is essentially identical and the subsequent description will be made with particular reference to unit 102. A typical unit, such as unit 102, would be able to hold approximately 4,000 pull-tab cards. This amount may represent an entire pull-tab gaming set, or a set may fill two or more units. Unit 102 holds cards in four racks 104, and the cards in each rack are visible through an overlying window 106. Having the cards visible allows the player to evaluate approximately how many cards remain. By comparing the number of remaining cards with the number of remaining winning cards as indicated on poster 32, as described above, the player is able to estimate the odds of receiving a winning card.

Beneath each window is a button 108 that the player can push to dispense a card from the above stack. Providing the player the ability to select the stacks gives the player some sense of control over the game. After the player selects the stack, the card is dispensed into a bin 110 disposed beneath the buttons. Players pay for cards using a bill validator 112 built into the unit. A display 114 is provided to inform the player of how much credit they have remaining from money put into the bill validator. Thus, a player can feed the bill validator $20 to purchase twenty tickets at once. The cards, however, are only dispensed one at a time as the player selects and pushes one of the four buttons.

System 100 includes a control system 120 to which each of the units are operatively connected, such as by a serial cable 122. In the preferred embodiment, control system 120 is an IBM compatible computer running software known as Progressive Pull-Tab Version 1.3, produced by Paradise Valley Electronics, of Moscow, [ID] *Id.*, that allows the control system to communicate with each of the dispensing units, although any suitable software could be used. Control system 120 monitors the quantity of pull-tab cards dispensed by the dispensing units. In the preferred embodiment, each unit signals the control system when a player purchases cards and when a card is dispensed. Also in the preferred embodiment, the control system is a physically separated from the dispensing units, but it could just as well be incorporated in one of the dispensing units, or each unit could have its own control system.

System 100 also includes a jackpot display 130 operatively connected to the control system to display a jackpot value. In the preferred embodiment, the software on the control system keeps track of the jackpot value and sends information to the jackpot display. The redemption value of the jackpot card is determined by the jackpot value. In the preferred embodiment of the invention, the jackpot is set to a predetermined value at the beginning of the game, that is, when a new set of cards is loaded into the system to be dispensed. As the control system receives signals indicating sale of cards, it increases the jackpot value. For instance, the jackpot value may be incremented by five-percent of the price of each card, as they are sold. Although the jackpot value is incremented for every card sale in the preferred embodiment, it could be incremented less frequently, or additionally on occurrence of other events. For example, the jackpot could be incremented once for every five card sales or once every fifteen minutes, or both. In the preferred embodiment, the jackpot value is incremented by and stored in software in the computer, but the jackpot could be as simple as a mechanical counter that was incremented for every ticket sale or some fraction thereof.

As described above, a new game starts when a set of pull-tab cards, such as set 30 described above, is loaded into one or more dispensing units and the jackpot is set to a predetermined value. A pull-tab card is then dispensed to a player from a dispensing unit and the control system increments and displays the value of the progressive jackpot. This sequence of displaying, dispensing and incrementing is then repeated until the jackpot card is dispensed. When the jackpot card is dispensed, the player receiving that card is awarded the progressive jackpot.

Players receiving winning cards before or after the jackpot card is dispensed are able to redeem them for the predetermined value of the card. Thus, although the jackpot may have been awarded, the play of the game may continue until all the cards are dispensed, with the draw for players being the remaining winning cards. Alternatively, the game could be stopped as soon as the jackpot card is dispensed, or after all winning cards have been redeemed.

As mentioned above, [them] *there* may be more than one jackpot card in a gaming set. One reason for including additional jack-pot cards would be to prevent a player from holding a jackpot card after receiving it. In a game where there is only one jackpot card the player receiving it would be inclined to hold the card while the game continued and the jackpot increased. This could be unfair to fellow players who would not know that they are no longer competing for the jackpot. In a game with two or more jackpot cards, the player receiving the first card would be inclined to turn it in rapidly so that another player would not get the other jackpot card and turn it in first. If there were two or more jackpot cards, the jackpot could be restarted after each jackpot card was redeemed.

It would also be possible to address the problem of a player holding the jackpot card by providing a time or current jackpot value stamp on the card. Thus, a player would only receive the jackpot value at the time the card was issued.

In the preferred embodiment, the control system may be connected to a large number of dispensing units. The control system, using identification codes and software is able to segregate these dispensing units into various groups of one or more machines. Each group can then be used to play an independent game. Thus, if there are twenty-one dispensing units connected to the control system, they may be divided into two groups of five, a group of ten, and a group of one. Each group would then have an independent jackpot display and separate gaming set. Preferably, of course, the group with ten dispensing units would be used with a gaming set having ten times as many cards as the gaming set for the group with one dispensing unit.

In a progressive game it can be desirable to link multiple machines, and therefore more players, in a single game because the associated potential jackpot will generally go up with the number of cards making up the game. For instance, if each dispensing unit will hold 4,000 cards, then the group including ten dispensing units can be filled with a gaming set including 40,000 cards. On average, in a game with just one jackpot card, the jackpot will get to a value ten-times larger before the jackpot card is dispensed in a 40,000 card game than would be the case with a 4,000 card game.

In the preferred embodiment, the operator is provided with complete flexibility to control the parameters of the jackpot using the control system. In particular, the operator of the game can, using the software running on the control system, select the initial value of the jackpot, i.e., $500. Also, in the preferred embodiment the operator is also able to select an increment percentage for each sale of a pull-tab card. Such values might range from a few percent to 25-percent or more. If the value was 10-percent, then for $1 cards the jackpot would be increased by 10¢ for every pull-tab card sale. The values are selected to make the game appeal to players and maintain a profit for the operator. Thus, a large initial jackpot value may be used in conjunction with a smaller percentage increment. On the other hand, a large percentage increment may be used with a small initial value. The control system is also able to track total sales and various auditing data from the dispensing units.

It will now be clear that an improvement in this art has been provided which accomplishes the objectives set forth above. While the invention has been disclosed in its preferred form, it is to be understood that the specific embodiments which have been depicted and described are not to be considered in a limited sense because there may be other forms which should also be construed to come within the scope of the appended claims.

I claim:

1. A pull-tab gaming set for use in a progressive game, the set comprising a plurality of pull-tab cards, each card having a front portion, a back portion and a selectively revealable gaming section which contains indicia of a redemption value of the card, the redemption value being unascertainable until the gaming section is revealed and where the gaming set includes at least three classes of pull-tab cards in the form of winners having indicia of a fixed non-zero value, losers having indicia of a zero value and at least one jackpot card [with indicia of], *wherein each of said at least one jackpot cards is designated as a jackpot card by indicia on said jackpot card prior to the play of said progressive game, said indicia on said jackpot card having an undetermined total value*.

2. The pull-tab gaming set of claim 1, wherein the front portion of each pull-tab card further comprises a serrated region that is at least partially removable from the pull-tab card, and wherein at least part of the gaming section is located under the serrated region.

3. The pull tab [cards] *gaming set* of claim 1, wherein the front portion of each pull-tab card further comprises a peelable region, and wherein the gaming section is located beneath the peelable region.

4. The pull tab [cards] *gaming set* of claim 1, wherein the gaming section is covered by a scratch-off coating.

5. The pull-tab gaming set of claim 1, wherein the class of winning cards is divided into at least two sub-classes, where each sub-class has a unique indicia and value.

6. The pull-tab gaming set of claim 5, wherein each of the pull-tab cards further comprises a legend depicting a number of winning cards in each sub-class, the unique indicia associated therewith and the value of cards in such subclass.

7. The pull-tab gaming set of claim 6, wherein each of the legend further depicts the indicia associated with the at least one jackpot card.

8. The pull tab [cards] *gaming set* of claim 1, wherein each of the pull-tab cards further comprises a game code.

9. The pull tab [cards] *gaming set* of claim 1, wherein each of the pull-tab cards further comprises a verification code.

10. The pull tab [cards] *gaming set* of claim 9, wherein the verification code is located within the gaming section.

11. The pull-tab gaming set of claim 1, wherein the undetermined value of the at least one jackpot card includes a fixed value plus an additional value to be determined during play of the progressive game.

12. A progressive pull-tab card game system comprising:

a pull-tab dispensing unit, configured to dispense pull-tab cards;

a jackpot display; and a control system operatively connected to the dispensing unit to monitor the quantity of pull-tab cards dispensed and configured to compute a jackpot value dependent on that quantity, the control system further being operatively connected to the jackpot display to cause it to display the computed jackpot value as pull-tab cards are dispensed.

13. The system of claim 12, wherein the dispensing unit communicates with the control system and reports each sale of a pull-tab card to the computer.

14. The system of claim 12, wherein the control system is configured to have a predetermined initial jackpot value before any pull-tab cards have been dispensed.

15. The system of claim 14, wherein the predetermined initial jackpot value is greater than zero.

16. The system of claim 14, wherein the control system is configured to compute the jackpot value by periodically incrementing it by a predetermined value every time a predetermined number of pull-tab cards is dispensed.

17. The system of claim 12, wherein the dispensing unit further includes a plurality of pull-tab racks, a slot for dispensing pull-tab cards, and a mechanism for allowing a user to select a specific pull-tab rack.

18. The system of claim 12, further including a pull-tab gaming set comprising a plurality of pull-tab cards, each card having a front portion, a back portion and a selectively revealable gaming section which contains indicia of a redemption value of the card, the redemption value being unascertainable until the gaming section is revealed and where the gaming set includes at least three classes of pull-tab cards in the form of winners having indicia of a fixed non-zero value, losers having indicia of a zero value and at least one jackpot card with indicia of an undetermined total value.

19. The system of claim 12, further including a plurality of pull-tab dispensing units, where the control system is operatively connected to each dispensing unit to monitor the quantity of pull-tab cards dispensed.

20. The system of claim 19, wherein the control system computes the jackpot value dependent on the quantity of pull-tab cards dispensed from all of the dispensers.

21. A method of operating a progressive pull-tab game, comprising:

providing a set of pull-tab cards which includes at least one jackpot card [without a predetermined], *wherein said at least one jackpot card is designated as a jackpot card by indicia on the jackpot card prior to the play of the progressive pull-tab game, and further wherein said indicia on the jackpot card have an undetermined* total value;

setting a progressive jackpot to a predetermined value;

displaying the progressive jackpot;

dispensing one of the pull-tab cards to a player;

selectively increasing the value of the progressive jackpot;

repeating the steps of displaying, dispensing and selectively increasing until the jackpot card is dispensed; and then awarding the progressive jackpot to the player that received the jackpot card.

22. The method of claim 21, wherein the dispensing step is preceded by the step of allowing a player to select a particular pull-tab rack from a plurality of pull-tab racks within a pull-tab dispensing unit.

23. The method of claim 21, wherein the dispensing step is preceded by the step of allowing a player to choose a particular pull-tab dispensing unit from a predetermined number of pull-tab dispensing units.

24. The method of claim 23, further including the steps of distributing the set of pull-tab cards among the predetermined number of pull-tab dispensing units and operatively connecting predetermined number of pull-tab dispensing units to a single progressive jackpot.

25. The method of claim 21, wherein the step of providing includes the step of selecting a set of pull-tab cards in which each card has a front portion, a back portion and a selectively revealable gaming section which contains indicia of a redemption value of the card, the redemption value being unascertainable until the gaming section is revealed and where the gaming set includes at least three classes of pull-tab cards in the form of winners having indicia of a fixed non-zero value, losers having indicia of a zero value and the at least one jackpot card.

*26. A pull-tab gaming set for use in a progressive game, the set comprising a plurality of pull-tab cards, each card having a selectively revealable gaming section that contains indicia of a redemption value of the cards, the redemption value being unascertainable until the gaming section is revealed and where the gaming set includes pull-tab cards in the form of winners having indicia of a fixed non-zero value and at least one jackpot card, wherein each of said at least one jackpot cards is designated as a jackpot card by indicia on said jackpot card prior to the play of said progressive game, said indicia on said jackpot card having an undetermined total value.*

*27. The pull-tab gaming set of claim 26, wherein the winning cards are divided into at least two sub-classes, where each sub-class has a unique indicia and value.*

*28. The pull-tab gaming set of claim 26, wherein the undetermined total value of at least one jackpot card includes a fixed value plus an additional value to be determined during play of the progressive game.*

*29. The pull-tab gaming set of claim 26, wherein the gaming set further includes pull-tab cards in the form of losers with indicia of zero value.*

*30. The pull-tab gaming set of claim 26, wherein the gaming set includes at least two jackpot cards with indicia of undetermined total value.*

*31. A progressive pull-tab card game system comprising:*

*a pull-tab dispenser, adapted to dispense pull-tab cards;*

*a jackpot display; and*

*a control system operatively connected to the dispenser to monitor the dispensing of pull-tab cards and configured to compute a jackpot value dependent on the dispensing of pull-tab cards, the control system further being operatively connected to the jackpot display to cause it to display the computed jackpot value as pull-tab cards are dispensed.*

*32. The system of claim 31, wherein the control system is configured to compute the jackpot value by periodically incrementing a selectable initial value by a predetermined value every time a predetermined number of pull-tab cards is dispensed.*

*33. The system of claim 31, wherein the dispenser further includes a plurality of pull-tab racks, a slot for dispensing pull-tab cards and a mechanism for allowing a user to select a specific pull-tab rack.*

*34. The system of claim 31, further including a pull-tab gaming set comprising a plurality of pull-tab cards, each card having a selectively revealable gaming section which contains indicia of a redemption value of the card, the redemption value being unascertainable until the gaming section is revealed and where the gaming set includes pull-tab cards in the form of winners having indicia of a fixed non-zero value and at least one jackpot card with indicia of an undetermined total value.*

*35. The system of claim 31, further including a plurality of pull-tab dispensing units, where the control system is operatively connected to each dispensing unit to monitor the quantity of pull-tabs dispensed.*

*36. The system of claim 35, wherein the control system computes the jackpot value dependent on the quantity of pull-tabs dispensed from all of the dispensers.*

*37. A method of operating a progressive pull-tab game, comprising:*

*providing a set of pull-tab cards which includes at least one jackpot card, wherein each of said at least one jackpot cards id designated as a jackpot card by indicia on said jackpot card prior to the play of said progressive pull-tab game, said indicia on said jackpot card having an undetermined total value;*

*setting a progressive jackpot to a predetermined value;*

*displaying the progressive jackpot;*

*selling one of the pull-tab cards to a player;*

*selectively increasing the value of the progressive jackpot;*

*repeating the steps of displaying, selling and selectively increasing until the jackpot card is dispensed; and then*

*awarding the progressive jackpot to the player that received the jackpot card.*

*38. The method of claim 37, wherein the selling step is preceded by the step of allowing a player to select a particular pull-tab rack from a plurality of pull-tab racks within a pull-tab dispensing unit.*

*39. The method of claim 37, wherein the selling step is preceded by the step of allowing a player to choose a particular pull-tab dispensing unit from a predetermined number of pull-tab dispensing units.*

*40. The method of claim 39, further including the steps of distributing the set of pull-tab cards among the plural pull-tab dispensing units and operatively connecting plural pull-tab dispensing units to a single progressive jackpot.*

*41. The method of claim 37, wherein the step of providing includes the step of selecting a set of pull-tab cards in which each card has a selectively revealable gaming section which contains indicia of a redemption value of the card, the redemption value being unascertainable until the gaming section is revealed and where the gaming set includes pull-tab cards in the form of winners having indicia of a fixed non-zero value and the at least one jackpot card.*

*42. The method of claim 37, wherein the step of selectively increasing is repeated every time a pull-tab card is sold in the step of selling.*

*43. The method of claim 37, wherein the step of displaying is repeated every time a pull-tab card is sold.*

*44. A method of conducting a pull-tab game comprising:*

*providing a set of pull-tab cards including at least one jackpot card mixed in with a multiplicity of non-jackpot cards with predetermined values, wherein each of said at least one jackpot cards is designated as a jackpot card by indicia on said jackpot card prior to the play of said pull-tab game, said indicia on said jackpot card having an undetermined total value;*

*distributing the pull-tab cards from the set of pull-tab cards sequentially to multiple players in a fashion so that the players do not known when the at least one jackpot card will be distributed; and*

*when the jackpot card is distributed, awarding a jackpot to the player to whom the jackpot card was distributed, where the value of the jackpot awarded is dependent on when, in the sequence of distributing the cards, the jackpot card is distributed.*

*45. The method of claim 44, further including the steps of setting a progressive jackpot to a predetermined initial value and selectively increasing the value of the progressive jackpot upon the distributing of pull-tab cards prior to awarding the jackpot.*

*46. A gaming set for use in a progressive game, the set comprising a plurality of play, each play having a selectively revealable gaming section that contains indicia of a redemption value, the redemption value being unascertainable until the gaming section is revealed, and where the redemption value is a fixed non-zero value, a zero value or a jackpot value, wherein at least one play is designated as a jackpot play by indicia on said play prior to playing said progressive game, said indicia on said jackpot play having an undetermined jackpot value, and wherein at least part of the jackpot value is to be determined during play of the progressive game.*

*47. A method of operating a progressive game, comprising:*

*providing a gaming set that includes a predetermined number of plays, each play having a selectively revealable gaming section that contains indicia of a redemption value, the redemption value being unascertainable until the gaming section is revealed, and where each redemption value is a fixed non-zero value, a zero value, or a jackpot value, and where at least one play has a redemption value that is the jackpot value, wherein the jackpot value is designated as the jackpot value by indicia on said play prior to playing said progressive game, said indicia on said jackpot value having an undetermined total value;*

*setting a progressive jackpot to a predetermined value;*

*displaying the progressive jackpot;*

*selling a play to a player;*

*selectively increasing the value of the progressive jackpot;*

*repeating the steps of displaying, selling and selectively increasing until the play having a redemption value that is the jackpot value is sold; and then*

*awarding the progressive jackpot to the player that received the play having the redemption value that is the jackpot value.*

*48. The method of claim 47, where the steps of providing and selling are accomplished by multiple machines linked together.*

*49. A gaming set for use in a progressive game, the set comprising a plurality of plays, each play having a selectively revealable gaming section that contains indicia of a redemption value of the play, the redemption value being unascertainable until the gaming section is revealed, and where the gaming set includes plays in the form of winners having indicia of a fixed non-zero value and at least one jackpot play with indicia on an undetermined total value, wherein the at least one jackpot play is designated as a jackpot play by indicia on said jackpot play prior to playing said progressive game.*

*50. A method of conducting a progressive game, comprising:*

*providing a set of plays including at least one jackpot play of undetermined value mixed in with a multiplicity of*

*non-jackpot plays with predetermined values, wherein each of said at least one jackpot play is designated as a jackpot play by indicia on said jackpot play prior to playing said progressive game;*

*distributing the plays from the set of plays sequentially to multiple players in a fashion so that the players do not know when the at least one jackpot play will be distributed; and*

*when the jackpot play is distributed, awarding a jackpot to the player to whom the jackpot play was distributed, where the value of the jackpot awarded is dependent on when, in the sequence of distributing the plays, the jackpot play is distributed.*

*51. A method of conducting a progressive game, comprising:*

*providing a gaming set that includes a predetermined number of revealable gaming sections, each revealable gaming section containing indicia of a redemption value, the redemption value being unascertainable until the gaming section is revealed, and each redemption value being one of a fixed non-zero value, a zero value, or a jackpot value, wherein the jackpot value is designated as the jackpot value by indicia on said revealable gaming section prior to playing said progressive game, said indicia on said revealable gaming section having an undetermined total value;*

*presenting to a player a revealable gaming section;*

*revealing the indicia associated with the presented revealable gaming section;*

*determining whether the redemption value associated with the revealed indicia is a fixed non-zero value, a zero value, or a jackpot value;*

*if the redemption value is a fixed non-zero value, then awarding the fixed non-zero value, selectively increasing the jackpot value, and repeating the steps of presenting, revealing, determining, awarding and selectively increasing, until indicia is revealed of a redemption value that is a jackpot value;*

*if the redemption value is a zero value, then awarding a zero value, selectively increasing the jackpot value, and repeating the steps of presenting, revealing, determining, awarding and selectively increasing, until indicia is revealed of a redemption value that is a jackpot value; and*

*if the redemption value is a jackpot value, then awarding the jackpot value.*

* * * * *

UNITED STATES PATENT AND TRADEMARK OFFICE

CERTIFICATE OF CORRECTION

PATENT NO. : RE 37,371 E
DATED : September 18, 2001
INVENTOR(S) : Jay E. Gerow

It is certified that error appears in the above-identified patent and that said Letters Patent is hereby corrected as shown below:

Column 8,
Line 27, after "value of the" delete "cards" and insert -- card -- therefor.

Column 9,
Line 21, after "jackpot cards" delete "id" and insert -- is -- therefor.

Column 10,
Line 14, after "a plurality of" delete "play" and insert -- plays -- therefor.

Signed and Sealed this

Fourth Day of June, 2002

*Attest:*

*Attesting Officer*

JAMES E. ROGAN
*Director of the United States Patent and Trademark Office*